(12) United States Patent  
Salinger et al.

(10) Patent No.: US 12,096,165 B2  
(45) Date of Patent: *Sep. 17, 2024

(54) HYBRID FIBER COAXIAL NODE

(71) Applicant: Comcast Cable Communications, LLC, Philadelphia, PA (US)

(72) Inventors: Jorge Daniel Salinger, Littleton, CO (US); David Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,359

(22) Filed: Sep. 16, 2022

(65) Prior Publication Data

US 2023/0083085 A1    Mar. 16, 2023

Related U.S. Application Data

(63) Continuation of application No. 16/991,500, filed on Aug. 12, 2020, now Pat. No. 11,483,636, which is a (Continued)

(51) Int. Cl.
*H04Q 11/00* (2006.01)
*H04B 10/2575* (2013.01)
(Continued)

(52) U.S. Cl.
CPC ... *H04Q 11/0067* (2013.01); *H04B 10/25751* (2013.01); *H04J 14/0282* (2013.01); (Continued)

(58) Field of Classification Search
CPC ............ H04Q 11/0067; H04Q 11/0071; H04B 10/25751; H04J 14/0246; H04J 14/0247;
(Continued)

(56) References Cited

U.S. PATENT DOCUMENTS 5,544,161 A    8/1996  Bigham et al.
6,161,011 A    12/2000 Loveless
(Continued)

FOREIGN PATENT DOCUMENTS

WO    200303007547 A2    1/2003

OTHER PUBLICATIONS

Lin et al; An Investigation into HFC MAC Protocols: Mechanisms, Implementation, and research issues; 2000; IEEE communications; pp. 1-12. (Year: 2000).*

(Continued)

*Primary Examiner* — Amritbir K Sandhu
(74) *Attorney, Agent, or Firm* — Banner & Witcoff, Ltd.

(57) ABSTRACT

Digital information can be carried on the fiber leg of an access network using binary modulation. Binary modulated data received at an O/E node can then be modulated onto an analog waveform using quadrature amplitude modulation or some other technique for modulating an analog waveform and transmitted over, for example, the coaxial leg of the network. The O/E node may also receive an analog signal, over the coaxial leg, modulated to carry upstream data from subscriber devices. The O/E node may demodulate the upstream signal to recover the upstream data and forward that upstream data over the fiber leg using a binary modulated optical signal.

30 Claims, 5 Drawing Sheets

Related U.S. Application Data continuation of application No. 16/141,121, filed on Sep. 25, 2018, now Pat. No. 10,779,064, which is a continuation of application No. 12/751,050, filed on Mar. 31, 2010, now Pat. No. 10,117,006.

(51) Int. Cl.
*H04J 14/02* (2006.01)
*H04L 12/28* (2006.01)

(52) U.S. Cl.
CPC ...... *H04J 14/0298* (2013.01); *H04L 12/2801* (2013.01); *H04J 14/0246* (2013.01); *H04J 14/0247* (2013.01); *H04J 14/0252* (2013.01); *H04Q 11/0071* (2013.01)

(58) Field of Classification Search
CPC .............. H04J 14/0252; H04J 14/0282; H04J 14/0298; H04L 12/2801
USPC .......................................................... 398/74
See application file for complete search history.

(56) References Cited

U.S. PATENT DOCUMENTS

| | | | |
|---|---|---|---|
| 6,185,680 B1 | 2/2001 | Shimbo et al. | |
| 6,285,681 B1 | 9/2001 | Kolze et al. | |
| 6,301,223 B1 | 10/2001 | Hrastar et al. | |
| 6,381,248 B1 | 4/2002 | Lu | |
| 6,490,727 B1 | 12/2002 | Nazarathy et al. | |
| 6,952,428 B1 | 10/2005 | Necka et al. | |
| 7,007,297 B1 | 2/2006 | Woodward | |
| 7,031,335 B1 | 4/2006 | Donohue et al. | |
| 7,065,779 B1 | 6/2006 | Crocker et al. | |
| 7,145,887 B1 | 12/2006 | Akgun et al. | |
| 7,209,442 B1 | 4/2007 | Chapman | |
| 7,242,868 B2 | 7/2007 | Soto et al. | |
| 7,519,297 B2 | 4/2009 | Hahin et al. | |
| 7,551,610 B2 | 6/2009 | Cummings et al. | |
| 7,639,954 B2 | 12/2009 | Lam et al. | |
| 7,675,938 B2 | 3/2010 | Kolze | |
| 7,688,828 B2 | 3/2010 | Chapman et al. | |
| 7,720,090 B2 | 5/2010 | Limb et al. | |
| 7,778,546 B2 | 8/2010 | Sucharczuk et al. | |
| 7,940,703 B2 | 5/2011 | Roy | |
| 8,050,562 B2 | 11/2011 | Lee et al. | |
| 8,094,661 B2 | 1/2012 | Salinger et al. | |
| 8,401,384 B2 | 3/2013 | Wakayama et al. | |
| 8,428,063 B2 | 4/2013 | Salinger et al. | |
| 8,842,991 B2 | 9/2014 | Liang et al. | |
| 10,117,006 B2 | 10/2018 | Salinger et al. | |
| 10,779,064 B2 * | 9/2020 | Salinger ........... | H04B 10/25751 |
| 2002/0027596 A1 | 3/2002 | Roy | |
| 2002/0093970 A1 | 7/2002 | Amit | |
| 2003/0194241 A1 | 10/2003 | Farmer | |
| 2004/0045037 A1 | 3/2004 | Cummings et al. | |
| 2004/0081203 A1 | 4/2004 | Sodder et al. | |
| 2005/0063424 A1 | 3/2005 | Weinstein et al. | |
| 2005/0078699 A1 | 4/2005 | Cummings | |
| 2005/0138670 A1 | 6/2005 | Ploumen | |
| 2005/0172328 A1 | 8/2005 | Park et al. | |
| 2005/0265397 A1 | 12/2005 | Chapman et al. | |
| 2006/0168612 A1 | 7/2006 | Chapman et al. | |
| 2006/0271988 A1 * | 11/2006 | Chapman ........... | H04N 7/17309 725/111 |
| 2007/0050835 A1 | 3/2007 | Liva et al. | |
| 2007/0058680 A1 | 3/2007 | Choi et al. | |
| 2007/0177597 A1 | 8/2007 | Ju | |
| 2007/0189770 A1 | 8/2007 | Sucharczuk et al. | |
| 2008/0138071 A1 | 6/2008 | Lee et al. | |
| 2008/0193137 A1 * | 8/2008 | Thompson .......... | H04L 12/2801 398/115 |
| 2008/0279556 A1 | 11/2008 | Yu et al. | |
| 2008/0317472 A1 | 12/2008 | Park et al. | |
| 2009/0049492 A1 * | 2/2009 | Pantelias .................. | H04N 7/22 725/109 |
| 2009/0092040 A1 | 4/2009 | Dapper et al. | |
| 2009/0158376 A1 * | 6/2009 | Hong ..................... | H04N 7/173 725/116 |
| 2009/0205007 A1 * | 8/2009 | Woodward .......... | H04J 14/0246 725/129 |
| 2009/0249421 A1 | 10/2009 | Liu et al. | |
| 2010/0014605 A1 | 1/2010 | Geile et al. | |
| 2010/0017833 A1 | 1/2010 | Abramson et al. | |
| 2010/0061729 A1 | 3/2010 | Weeber | |
| 2010/0074277 A1 | 3/2010 | Nishibayashi et al. | |
| 2010/0083330 A1 | 4/2010 | Bernstein et al. | |
| 2010/0104287 A1 | 4/2010 | Biegert et al. | |
| 2010/0254386 A1 | 10/2010 | Salinger et al. | |
| 2010/0260505 A1 | 10/2010 | Dahan et al. | |
| 2010/0284420 A1 | 11/2010 | Limb et al. | |
| 2011/0055875 A1 | 3/2011 | Zussman | |
| 2011/0058813 A1 | 3/2011 | Boyd et al. | |
| 2011/0078755 A1 * | 3/2011 | Dai .................... | H04Q 11/0067 725/111 |
| 2011/0085538 A1 | 4/2011 | Feinberg | |
| 2011/0117956 A1 | 5/2011 | Levi et al. | |
| 2011/0142042 A1 | 6/2011 | Field | |
| 2011/0243563 A1 | 10/2011 | Salinger et al. | |
| 2012/0076156 A1 | 3/2012 | Kletti | |
| 2012/0275784 A1 | 11/2012 | Soto et al. | |
| 2012/0287929 A1 | 11/2012 | Field | |
| 2013/0125194 A1 | 5/2013 | Finkelstein et al. | |
| 2013/0177023 A1 | 7/2013 | Salinger et al. | |
| 2014/0137177 A1 | 5/2014 | Rakib | |

OTHER PUBLICATIONS

Lin et al ;An Investigation into HFC MAC Protocols: Mechanisms, Implementation, and research issues ; 2000; IEEE Communications survey; pp. 1-12. (Year: 2000).*

Salinger, Jorge D. and Leddy, John, 2009 SCTE Conference on Emerging Technologies®, Proposed Next Generation Cable Access Network Architecture, pp. 1-12.

Salinger, Jorge D. and Leddy, John, 2009 SCTE Conference on Emerging Technologies, Proposed Next Generation Access Architecture (NGAA) PowerPoint Presentation, 7 pages.

Jerry Learned, "Hybrid Fiber/Coax Options Explode for Last Mile", Broadband Access, Communication Systems Design, Aug. 2002, pp. 28-31.

Wikipedia article titled "Verizon FiOS", downloaded Aug. 25, 2009, 8 pages.

Extended European Search Report—EP 11157936.3—Mailing Date: Apr. 23, 2014.

Ying-Dar Lin et al., "An investigation into HFC MAC protocols: mechanisms, implementation, and research issues," EEE Communication Surveys, 2000, pp. 2-13.

EP Office Action—EP App 11157936.3—Mailed May 9, 2016.
Mar. 8, 2017—Canadian Office Action—App. No. 2734218.
Feb. 1, 20189—Canadian Office Action—CA 2,734,218.
May 24, 2018—European Office Action—11157936.3.
Feb. 11, 2019—Canadian Office Action—CA 2,734,218.
Feb. 5, 2020—Canadian Office Action—CA 2,734,218.
Apr. 1, 2020—European Office Action—EP 11157936.3.
Sep. 24, 2021—Canadian Office Action—CA 2,734,218.
May 12, 2022—European Office Action—EP 11157936.3.

* cited by examiner

HYBRID FIBER COAXIAL NODE

CROSS-REFERENCE TO RELATED APPLICATIONS

This application is a continuation of U.S. application Ser. No. 16/991,500, filed Aug. 12, 2020, which is a continuation of U.S. application Ser. No. 16/141,121, filed Sep. 25, 2018, now U.S. Pat. No. 10,779,064, which is a continuation of U.S. application Ser. No. 12/751,050, filed Mar. 31, 2010, now U.S. Pat. No. 10,117,006, the contents of which are hereby incorporated by reference in their entireties.

BACKGROUND

Cable television (CATV) systems were initially developed to provide broadcast television content to subscriber premises over a wired connection. Early systems delivered analog television signals through a tree-and-branch coaxial cable architecture. These architectures also included numerous amplifiers, line extenders and other electronic components. CATV system operators subsequently began using hybrid fiber coaxial (HFC) networks that replaced a portion of a coaxial cable signal path with a more efficient fiber optic communication path. Typically, an HFC network uses fiber to carry signals optically from a hub or other location to optical/electrical conversion nodes ("O/E nodes"). The O/E nodes convert the optically transmitted signal to electrical signals that are transported from the O/E nodes to subscribers over coaxial cable.

Early HFC networks communicated analog NTSC signals in both the fiber and coaxial legs. Now, television has migrated to digital format. Providers, such as multiple service operators (MSOs), also employ HFC access networks to deliver high-speed data, telephony, video-on-demand (VOD) and numerous other services that rely on digital data. In effect, however, digital data is still carried over many HFC networks using analog signals. Specifically, digital data is often communicated in both the fiber and coaxial portions of an HFC network by modulating the phase and/or amplitude of a sinusoidal waveform. For example, a termination system, such as a cable modem termination system (CMTS), or other network element, may modulate digital data using quadrature amplitude modulation (QAM). This results in an analog signal in which digital data is represented by changes in the phase and/or amplitude of an analog radio frequency (RF) carrier wave. This analog signal is transmitted over the fiber portion of an HFC network by using a laser to generate that analog signal in optical form. An O/E node converts that optical analog signal to an electrical version of that signal and forwards it over the coaxial portion of the network. Ultimately, the electrical version of the modulated analog signal is received at a device in a subscriber premises and demodulated to recover digital data.

SUMMARY

This Summary is provided to introduce a selection of concepts in a simplified form that are further described below in the Detailed Description. This Summary is not intended to identify key features or essential features of the invention.

In at least some embodiments, digital information is carried on the fiber leg of an access network using binary modulation. In particular, downstream data is carried over the fiber leg using binary optical pulses instead of modulating the phase, amplitude or other characteristic of an analog waveform. Binary modulated data received at an O/E node is then modulated onto an analog waveform using QAM or some other modulation technique and transmitted over, for example, the coaxial leg of the network. The O/E node also receives an analog signal, over the coaxial leg, modulated to carry upstream data from subscriber devices. The O/E node demodulates the upstream signal to recover the upstream data and forwards that upstream data over the fiber leg using a binary modulated optical signal.

DETAILED DESCRIPTION

Figure 1:
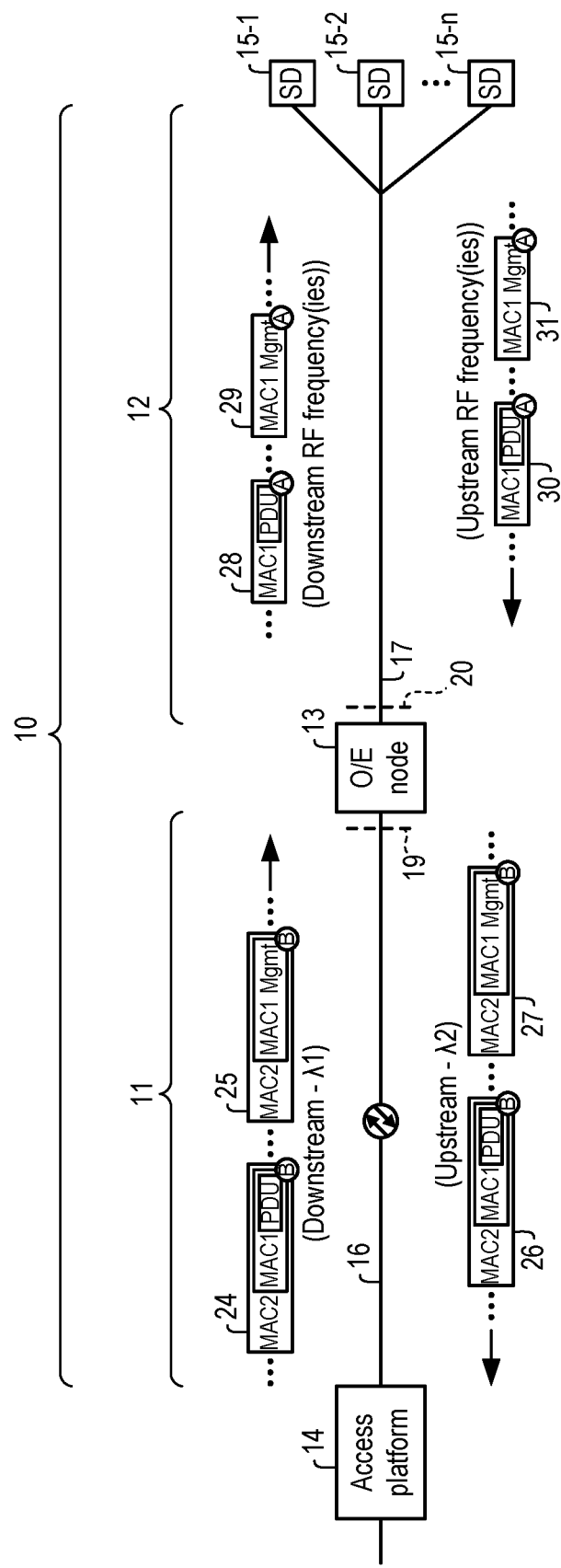
FIG. 1 is a block diagram showing an access network according to at least some embodiments.

In various embodiments described herein, digital data is communicated over the fiber leg of a network that utilizes fiber optic lines and other lines, such as coaxial cable lines. One example of such a network is a hybrid fiber coaxial (HFC) access network. Although the description may, by way example and for brevity refer to an HFC network, the disclosure is applicable to other networks that utilize fiber optic lines in combination with other lines, such as coaxial cable lines, to communicate with users. Digital data is communicated using binary modulation, with that digital data then recovered at an optical/electrical conversion node ("O/E node") and used to modulate an analog waveform. As used herein, "binary modulation" refers to techniques that communicate digital data (i.e., "0" and "1" bits) using binary optical pulses. "Binary optical pulses" refers to pulses that can only have one of two values (e.g., either OFF or ON). As one simple example of binary modulation, a laser could be turned ON for a time period $t_1$ to convey a "1" and turned OFF for the succeeding time period $t_2$ to convey a "0". However, binary modulation also includes more complex techniques such as using one sequence of binary optical pulses to convey a "1" and a different sequence of binary optical pulses to convey a "0", using binary optical pulses of equal amplitude but of different duration to convey "0" and "1", etc. Conversely, "analog modulation" refers to techniques that communicate digital data by varying the amplitude, phase and/or other characteristic of an analog waveform. Examples of analog modulation include but are not limited to various types of Quadrature Amplitude Modulation (QAM), phase shift keying (PSK), quadrature phase shift keying (QPSK), and Orthogonal Frequency Division Multiplexing (OFDM).

The below description of certain embodiments also refers to medium access control (MAC) protocols. As used herein, "MAC protocol" refers to a scheme by which the use of a particular communication medium (e.g., an optical fiber or a coaxial cable) is controlled and managed. Some aspects of a MAC protocol may include rules regarding the contents of MAC headers, encapsulation and/or other formatting that must be added to protocol data unit (PDU) packets being transmitted on the medium. Other aspects of a MAC protocol may include rules by which a device contends for transmission opportunities and/or obtains permission to transmit on the medium. For example, a device at a subscriber premises, such as a cable modem, may be required to obtain permission from a MAC function located in an access platform, such as a converged multi-service access platform (CMAP), before sending a data block on a coaxial medium, may receive confirmation from a MAC function that a contention-based transmission was successful, etc. Still other aspects of a MAC protocol may include other procedures for managing how various devices use a medium. As but one example, one device performing MAC functions may periodically determine physical distances to other devices and send management messages with timing adjustments, may periodically send management messages instructing other devices to adjust transmission power, may periodically poll devices to determine if those devices are still online, etc. All of the above exemplary aspects might not be part of some MAC protocols.

Different parts of an HFC access network may use different MAC protocols. For example, a fiber leg of an HFC network may use a MAC protocol associated with Gigabit Ethernet, with Ethernet passive optical network (EPON) standards (described, e.g., by Institute of Electrical and Electronics Engineers standard 802.3 and/or other IEEE standards), with Gigabit passive optical network (GPON) standards (as described, e.g., by International Telecommunication Union standard ITU-T G.984 and/or other ITU standards) or with some other set of standards. A coaxial leg of an HFC network may use a MAC protocol associated with the data over cable system interface specifications (DOCSIS) standards or with some other set of standards. More than one MAC protocol could be used on the same medium. For example, one MAC protocol could be used for communications over a fiber in one optical wavelength and a different MAC protocol could be used for communications over that fiber in a different optical wavelength. Similarly, one MAC protocol could be used for communications over a coax cable in one frequency band and a different MAC protocol could be used for communications over that cable in a different frequency band.

FIG. 1 is a block diagram showing an HFC access network 10 according to at least some embodiments. HFC network 10 includes an optical fiber leg 11 connecting O/E node 13 to CMAP 14 and a coaxial cable leg 12 connecting O/E node 13 to one or multiple subscriber devices (SD) 15-1 through 15-n. As used herein, a "subscriber" is a user such as a person, corporation or other entity that has arranged to obtain access to, and one or more services from, a network; the arrangement may (but need not necessarily) involve a fee or contractual relation. Each subscriber device can be, for example, a modem such as a cable modem (CM), a set top terminal (STT), a media terminal adaptor (MTA), a display device, or another device through which other devices (e.g., computers) in a subscriber premises can communicate over HFC network 10. For simplicity, FIG. 1 shows coaxial leg 12 as a single coaxial cable 17 split to subscriber devices 15-1 through 15-n. However, coaxial leg 12 could include numerous separate sections of coaxial feeder and drop cables, as well as amplifiers, splitters and other components. Similarly, fiber leg 11 is shown for simplicity as a single fiber 16, but could include multiple sections of optical fiber, amplifiers, splitters, etc. HFC network 10 could also include additional O/E nodes having fiber and coaxial cable legs connecting additional groups of subscriber devices, or individual subscriber devices, with CMAP 14.

O/E node 13 receives downstream communications from CMAP 14 across a fiber interface 19 and forwards downstream communications to subscriber devices 15-1 through 15-n across coaxial interface 20. Similarly, O/E node 13 receives upstream communications from subscriber devices 15-1 through 15-n across coaxial interface 20 and forwards those upstream communications to CMAP 14 across fiber interface 19. In the embodiment of FIG. 1, a first MAC protocol ("MAC1") is associated with communications on coaxial leg 12 over interface 20. A second MAC protocol ("MAC2") is associated with communications on fiber leg 11 over interface 19. MAC1 and MAC2 functions are controlled by CMAP 14.

In the embodiment of FIG. 1, upstream and downstream communications on fiber leg 11 are binary modulated, while communications on coaxial leg 12 are analog modulated. Upon receiving a binary modulated downstream communication signal across interface 19, O/E node 13 recovers digital data from that signal. O/E node 13 then analog modulates an analog electrical signal (or signal component) to represent at least a portion of the recovered data. The modulated electrical signal (or component) is then transmitted across interface 20 as part of a composite signal. When O/E node 13 receives an analog signal across interface 20, O/E node 13 demodulates that received signal to recover upstream data and then transmits that upstream data across interface 19 using binary modulation.

FIG. 1 shows examples of upstream and downstream data on fiber leg 11 in generally schematic form. Downstream data is transmitted over fiber leg 11 using binary pulses of light at a first wavelength $\lambda 1$. Downstream data block 24 includes a PDU packet. The PDU packet may contain data associated with Internet web browsing or email of a subscriber, may contain video on demand (VOD) content, may contain encoded voice data for a telephone call, or any of other numerous types of data. The PDU is encapsulated and/or otherwise formatted according to the MAC1 protocol associated with coaxial leg 12, and then is further formatted according to the MAC2 protocol associated with fiber leg 11. Downstream data block 25 includes a system management message ("Mgmt") according to the MAC1 protocol. That message may be an instruction to a subscriber device to adjust timing offset or power, an instruction to change to a different RF frequency, a grant of an upstream transmission request, a confirmation of a successful transmission in a contention time slot, or any of other numerous types of MAC1 management messages. The management message, which is also formatted according to the MAC1 protocol, is further formatted according to the MAC2 protocol. Data blocks 24 and 25 include a "B" in their lower left corners to indicate that the data in those blocks is communicated in a binary modulated signal.

Upstream data is communicated over fiber leg 11 using binary pulses of light at a second wavelength $\lambda 2$. In other embodiments, separate fibers could be used for upstream and downstream communications. Upstream data block 26 includes a PDU packet encapsulated and/or otherwise formatted according to the MAC1 protocol, which is then further formatted according to the MAC2 protocol. The PDU in block 26 could similarly include data related to a user accessing the Internet or sending an email, relating to a telephony session, relating to a VOD session (e.g., a command to start or stop play), etc. Upstream data block 27 includes a MAC1 management message (e.g., a request for access to the coaxial leg 12 medium, a response to a timing or range message, etc.) formatted according the MAC1 protocol and then further formatted according to the MAC2 protocol. As with blocks 24 and 25, a "B" in the lower left corners of blocks 26 and 27 indicates that the data in those blocks is communicated in a binary modulated signal.

FIG. 1 also shows examples of upstream and downstream data on coaxial leg 12 in generally schematic form. Downstream data is transmitted over coaxial leg 12 using QAM or some other type of analog modulation. In some embodiments, certain RF sub-bands are assigned as downstream communication channels (e.g., 6 MHz wide bands between 54 MHz and 860 MHz) and other sub-bands (e.g., sub-bands between 200 KHz to 6.4 MHz in width and located between 5 MHz and 42 MHz) are assigned as upstream communication channels. Downstream data block 28 includes a PDU packet encapsulated and/or otherwise formatted according to the MAC1 protocol. The MAC1-formatted PDU of block 28 was previously received by O/E node 13 over interface 19, with MAC2 formatting, as a binary modulated optical signal (similar to block 24). O/E node 13 obtains that MAC1-formatted PDU from the optical signal and transmits it over interface 20 using analog modulation. Similarly, O/E node 13 previously received the MAC1 management message of block 29 over interface 19, with MAC2 formatting, as a binary modulated optical signal (similar to block 25). O/E node 13 obtained that MAC1 management message from the optical signal and transmitted it over interface 20 using analog modulation. Data blocks 28 and 29 include an "A" in their lower left corners to indicate that the data in those blocks is communicated using an analog modulated signal.

Upstream data block 30 includes a MAC1-formatted PDU transmitted to O/E node 13 by one of subscriber devices 15-1 through 15-n. Upon receipt of data block 30 over interface 20 as an analog modulated electrical signal, O/E node 13 will demodulate that signal to recover data block 30, add MAC2 formatting to block 30, and transmit it over interface 19 as a binary modulated optical signal similar to block 26. Upstream data block 31 includes a MAC1 management message from one of subscriber devices 15-1 through 15-n. Upon receipt of data block 31 over interface 20 as an analog modulated electrical signal, O/E node 13 will also demodulate that signal to recover data block 31, add MAC2 formatting, and transmit the MAC2-formatted block 31 over interface 19 (similar to block 27). An "A" in the lower left corners of blocks 30 and 31 indicates that the data in those blocks is communicated using an analog modulated signal.

Figure 2:
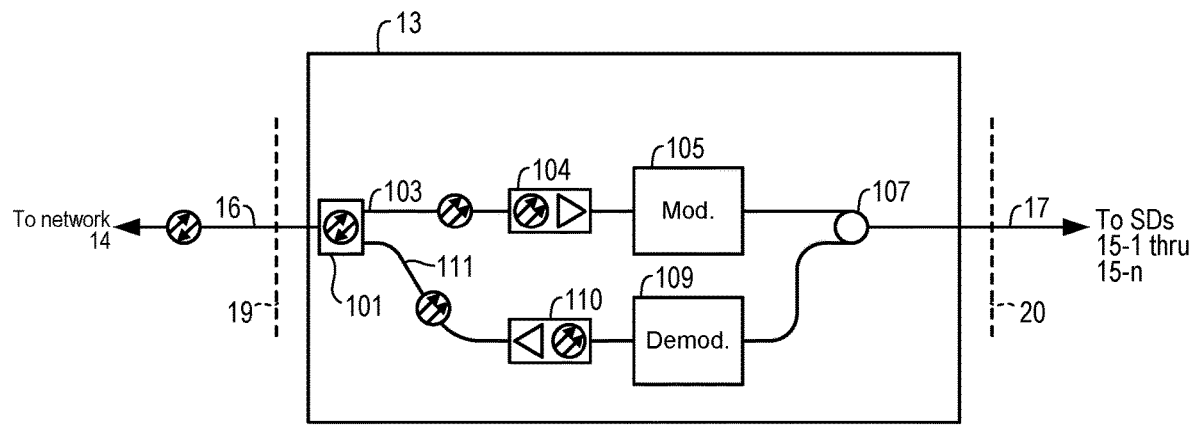
FIG. 2 is a block diagram showing additional details of the O/E node from FIG. 1.

FIG. 2 is an exemplary block diagram showing additional details of O/E node 13. Optical fiber 16 is coupled to a bidirectional optical multiplexer/demultiplexer (optical mux/demux) 101. A binary modulated optical signal communicating downstream data on wavelength λ1 is separated by optical mux/demux 101 and passed over fiber 103 to a receiver 104. Receiver 104 converts the optical signal to an electrical signal and passes it to modulator 105. Modulator 105, which is discussed in more detail below, recovers the downstream data from the electrical signal passed by receiver 104. Modulator 105 then uses the downstream data to analog modulate an analog signal component. That signal component is added to a composite signal output to a coaxial splitter 107 and over coaxial interface 20. A composite signal containing upstream communications over interface 20 passes through splitter 107 and into demodulator 109. Upstream data from demodulation of that signal are output from demodulator 109 into optical transmitter 110, which converts the upstream data into a binary modulated optical signal at wavelength λ2. That optical signal is then provided over fiber 111 to optical mux/demux 101 and transmitted upstream across interface 19.

In at least some embodiments, modulator 105 is a single chip having memory for storing instructions and data (e.g., buffers for data to be modulated), logic circuitry for executing stored instructions and/or hardwired logic so as to carry out herein described operations of modulator 105, and circuits for performing modulation and signal combining operations. Modulator 105 is able to simultaneously modulate data for different downstream channels by modulating analog wave signal components having carrier frequencies located in different RF sub-bands. Modulator 105 then combines the analog modulated signal components at different frequency sub-bands into a composite electrical signal for downstream transmission across interface 20.

Receiver 104 converts the binary-modulated electrical signal received on wavelength λ1 into an electrical form of that binary-modulated signal. Modulator 105 then binary demodulates that electrical signal to recover a downstream MAC2 data block (e.g., such as blocks 24 and 25 in FIG. 1). Notably, demodulating a binary-modulated signal is normally much simpler and less susceptible to error than demodulating an analog modulated signal. Depending on the type of binary modulation used, binary demodulation may result from simply converting the optical signal to electrical form.

Modulator 105 extracts the MAC1 data block from the recovered MAC2 data block. For example, upon recovering MAC2 data block 24, modulator 105 would extract the MAC1-formatted PDU, and upon recovering MAC2 data block 25, modulator 105 would extract the MAC1 management message. As part of extracting a MAC1 data block, modulator 105 determines which of multiple downstream RF channels is to be used for communicating that extracted MAC1 data block. In at least some embodiments, the downstream RF channel assignment is made by CMAP 14 or some other network element upstream from O/E node 13 and communicated to node 13 in a MAC2 data block. In some embodiments, the downstream RF channel assigned to a particular MAC1 data block could be encoded into the MAC2 header encapsulating that MAC1 data block. For example, CMAP 14 (FIG. 1) may have assigned the MAC1-formatted PDU of block 24 to be transmitted on downstream RF frequency A and the MAC1 message of block 25 to be transmitted on downstream RF frequency B. In such a case, CMAP 14 would include an identifier of frequency A in the MAC2 header of block 24 and an identifier of frequency B in the MAC2 header of block 25. In such an embodiment, modulator 105 could be configured to examine the appropriate MAC2 header field of each MAC1 data block to find the downstream frequency identifier. The downstream frequency could also be communicated to O/E node 13 in other ways. For example, CMAP 14 could include a separate data packet in block 24 (i.e., in addition to the MAC1-formatted PDU) prior to performing MAC2 formatting. In such embodiments, modulator 105 is configured to isolate that separate data packet in each MAC2 data block so as to find the downstream frequency identifier.

Once modulator 105 has determined the downstream frequency over which an extracted MAC1 data block is to be transmitted, the MAC1 data block is analog modulated onto an analog signal component at the determined frequency. The modulated analog signal component representing the MAC1 data block is then combined with modulated analog signal components representing MAC1 data blocks on other frequencies, and the composite signal is output over interface 20. Because modulator 105 merely modulates previously-created MAC1 data blocks received in MAC2 data blocks from CMAP 14, O/E node 13 need not perform any downstream MAC1 functions.

In at least some embodiments, demodulator 109 is also a single chip. That chip includes memory for storing instructions and data (e.g., buffers for data to be transmitted upstream), logic circuitry for executing stored instructions and/or hardwired logic so as to carry out herein described operations of demodulator 109, and circuits for performing demodulation operations. Demodulator 109 includes multiple tuners, with each tuner having corresponding demodulation circuitry. A composite upstream signal across interface 20 is input to demodulator 109. Demodulator 109 configures each tuner to isolate a portion of the composite signal corresponding to an analog signal component in a specific upstream frequency channel. The tuner's corresponding demodulation circuitry then demodulates the isolated portion of the composite signal so as to recover upstream MAC1 data blocks (e.g., such as blocks 30 and 31). Demodulator 109 adds MAC2 formatting to recovered MAC1 data blocks to create MAC2 data blocks, binary modulates those MAC2 data blocks, and causes optical transmitter 110 to communicate those binary modulated MAC2 data blocks upstream as an optical signal on wavelength $\lambda 2$. Demodulator 109 merely demodulates an analog signal to recover MAC1 data blocks created by subscriber devices and then forwards those MAC1 data blocks to a MAC1 function in CMAP 14. Accordingly, O/E node 13 need not perform upstream MAC1 functions.

Because modulator 105 and demodulator 109 simply relay MAC1 data frames without performing any MAC1 protocol processing, chips for modulator 105 and demodulator 109 can be much simpler than would be the case if those chips had to perform MAC1 protocol functions. Moreover, there are advantages to retaining MAC1 functions within a CMAP or other upstream element(s) that is (or are) more centrally located than an O/E node. For example, a central location for logic performing MAC functions facilitates reallocation of MAC processing resources among different service groups served by different O/E nodes, easier upgrades of MAC software and firmware, and easier scaling of MAC functionality to accommodate additional services and/or subscriber devices. Moreover, locating coaxial leg MAC processing in CMAP 14 or another upstream device facilitates simultaneous use of different MAC protocols for different services that might be communicated over coaxial leg 12. As one example, an MSO operating HFC network 10 may provide service U on downstream channel X and service V on downstream channel Y, with service U/channel X having one MAC protocol and service V/channel Y having a different MAC protocol. Because O/E node 13 simply relays data blocks over coaxial leg 12 without performing any coaxial leg MAC processing, O/E node 13 would not need additional processing circuitry to accommodate multiple coaxial leg MAC protocols.

In some embodiments, modulator 105 and/or demodulator 109 could alternately be implemented using multiple chips. For example, a first modulator chip could analog modulate data onto one group of available downstream RF channels, another chip could analog modulate data onto another group of available downstream RF channels, etc.

The MAC2 protocol used for communication over fiber leg 11 could be very simple. For example, communications in the downstream (and/or upstream) direction could simply be time divided into a series of fixed size data blocks separated by some recognizable delimiter between blocks. A MAC2-formatted MAC1 data block being sent over fiber leg 11 could consist of that delimiter plus a suitable number of stuffing bits. In some such embodiments, the downstream RF channel assigned to a downstream data block could be conveyed to O/E node 13 based on the location of the MAC2 data block. For example, each downstream $n^{th}$ block on fiber leg 11 might correspond to a first downstream RF channel on coaxial leg 12, each $(n+1)^{th}$ block on fiber leg 11 might correspond to a second downstream RF channel on coaxial leg 12, etc.

Figure 3:
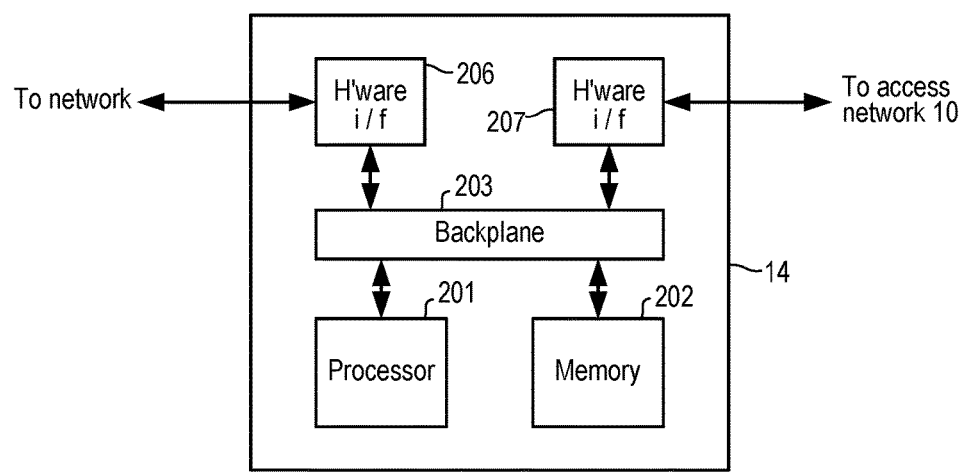
FIG. 3 is a block diagram showing additional details of the access platform from FIG. 1.

FIG. 3 is a block diagram of CMAP 14 according to some embodiments. CMAP 14 communicatively connects a national, regional or other type of wide-area network to one or more different types of access networks. In some embodiments, CMAP 14 may perform MAC, routing, packet processing and other functions (e.g., management functions) for each access network served by that CMAP. In at least some embodiments, CMAP 14 may perform operations associated with a DOCSIS cable modem termination system (CMTS) for an HFC access network. In other embodiments, CMAP 14 may also (or alternatively) perform the functions associated with an Edge QAM for the same access network. CMAP 14 may also (or alternatively) serve other types of access networks. A processor 201 executes instructions and controls operation of CMAP 14 so as to carry out operations described herein. CMAP 14 further includes memory 202 storing instructions for execution by processor 201 as well as other data that is stored and/or retrieved by processor 201. Processor 201 accesses memory 202 via one or more data busses in a backplane 203. Although single blocks are shown for processor 201 and for memory 202, memory and computational operations of CMAP 14 could respectively be distributed across multiple memory devices and multiple processors. Memory 202 may include volatile and non-volatile memory and can include any of various types of storage technology, including one or more of the following types of storage devices: read only memory (ROM) modules, random access memory (RAM) modules, flash memory, and EEPROM memory. Processor 201 may be implemented with any of numerous types of devices, including but not limited to one or more general purpose microprocessors, one or more application specific integrated circuits, one or more field programmable gate arrays, and combinations thereof. In at least some embodiments, processor 201 carries out operations described herein according to machine readable instructions stored in memory 202 and/or stored as hardwired logic gates within processor 201. CMAP 14 communicates with other network elements and/or a backbone network over one or more hardware interface cards 206 (e.g., Gigabit Ethernet cards). CMAP 14 communicates over access network 10 through a hardware optical interface 207 that includes optical receivers and transmitters and an optical mux/demux similar to those shown in FIG. 2. Processor 201 sends data and instructions to, and receives data from, interface card 206 and hardware optical interface 207 via backplane 203.

CMAP 14 could alternatively be implemented as multiple devices. For example, a first device could generate and/or format data blocks and then send those data blocks over a network connection to a second device. The second device could then binary modulate an optical signal and transmit that optical signal over fiber leg 11. Although a CMAP communicates across fiber leg 11 with O/E node 13 in the embodiment of FIG. 2, this is only one example. In other embodiments, other types of devices (or combinations of devices) communicate binary modulated data across a fiber leg to an O/E node.

Figure 4:
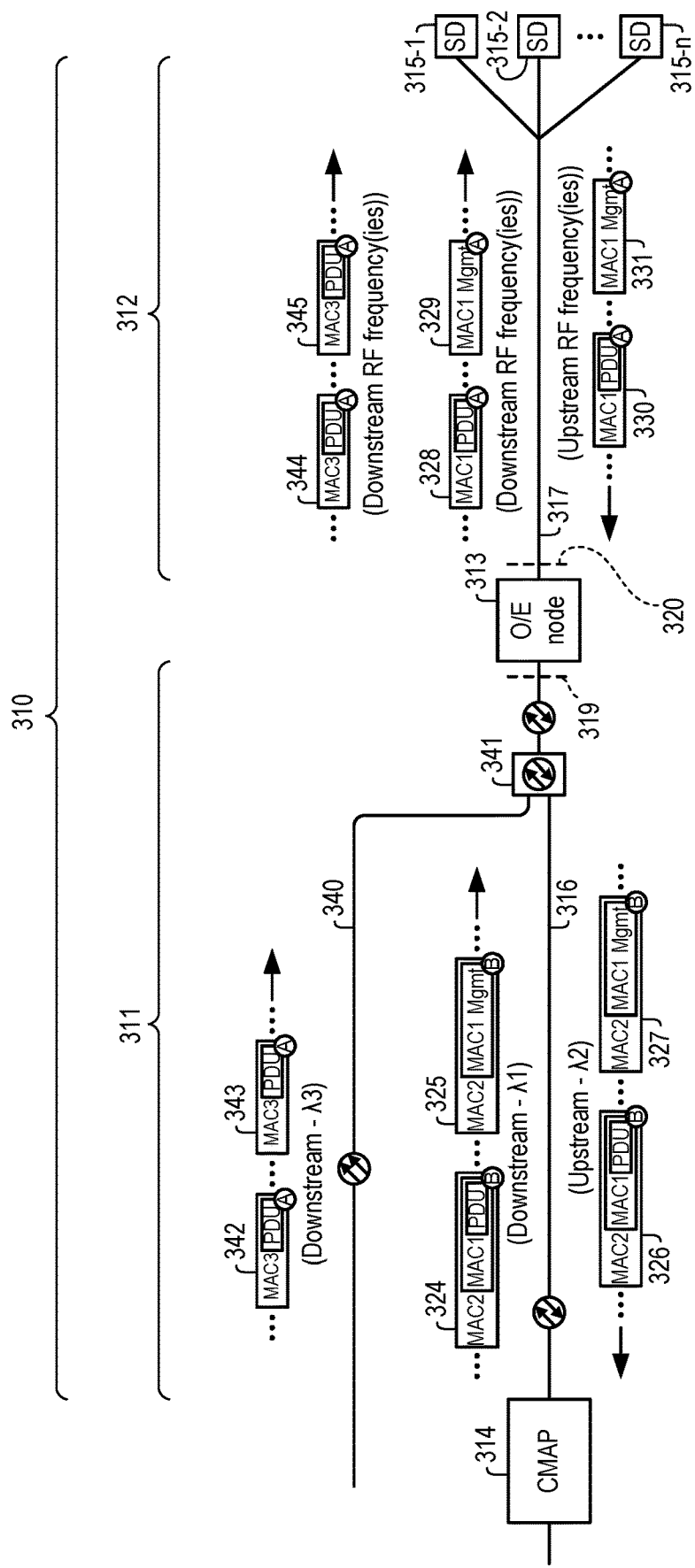
FIG. 4 is a block diagram showing an access network according to at least some additional embodiments.

FIG. 4 is a block diagram showing an HFC access network 310, according to at least some additional embodiments, having a fiber leg 311 and a coaxial leg 312. CMAP 314 is similar to CMAP 14 of FIG. 1, transmits downstream data blocks 324 and 325 (similar to blocks 24 and 25 of FIG. 1) on wavelength λ1 over fiber 316, and receives upstream data blocks 326 and 327 (similar to blocks 22 and 27 of FIG. 1) on wavelength λ2 over fiber 316. Except as described below, O/E node 313 is similar to O/E node 13 of FIG. 1. O/E node 313 receives data blocks from (and sends data blocks to) CMAP 314 over a fiber interface 319. O/E node 313 also sends downstream data blocks 328 and 329 (similar to blocks 28 and 29 of FIG. 1) to subscriber devices 315-1 through 315-n over a coaxial interface 320 and receives upstream data blocks 330 and 331 (similar to blocks 30 and 31 of FIG. 1) over interface 320 from the those subscriber devices.

Unlike O/E node 13 in access network 10, O/E node 313 receives data across fiber interface 319 that is analog modulated. In some embodiments, for example, data that is to be communicated downstream over coaxial leg 312 in RF channels within a first channel group (e.g., channels above 390 MHz) are communicated over fiber leg 311 in binary modulated form, analog modulated by O/E node 313, and then communicated over coaxial leg 312 as modulated analog signal components in RF channels of the first group. However, data to be communicated downstream over coaxial leg 312 in RF channels within a second group (e.g., channels between 54 MHz and 390 MHz) are analog modulated in a head-end and transmitted over a fiber 340 in a wavelength λ3 as components of a modulated analog optical signal (e.g., as an optical carrier wave having QAM-modulated signal components between 54 MHz and 390 MHz). Fiber 340 joins with an optical mux/demux 341, with downstream communications in wavelengths λ1 and λ3 continuing from optical mux/demux 341 to O/E node 313. Because data received by O/E node 313 in wavelength λ3 is already contained in an analog modulated signal, node 313 can simply convert that signal to electrical form and forward it across interface 320.

FIG. 4 shows examples of analog modulated data blocks transmitted in fiber leg 311 (blocks 342 and 343) and examples of such data transmitted in coaxial leg 312 (blocks 344 and 345). Blocks 342-345 contain PDUs formatted according to a MAC protocol ("MAC3"). MAC3 could be the same as MAC1, the same as MAC 2, or could be some other MAC protocol. In some embodiments, the data communicated in an analog modulated optical signal on wavelength λ3 is an MPEG transport stream carrying audio and/or video programming content. The analog signal carried over fiber leg 311 in wavelength λ3 could include multiple components that each carries digital data using a different type of analog modulation. For example, the wavelength λ3 signal could be a composite of QAM-64 modulated carriers at a first group of RF frequencies and QAM-256 modulated carriers at a second group of RF frequencies.

Figure 5:
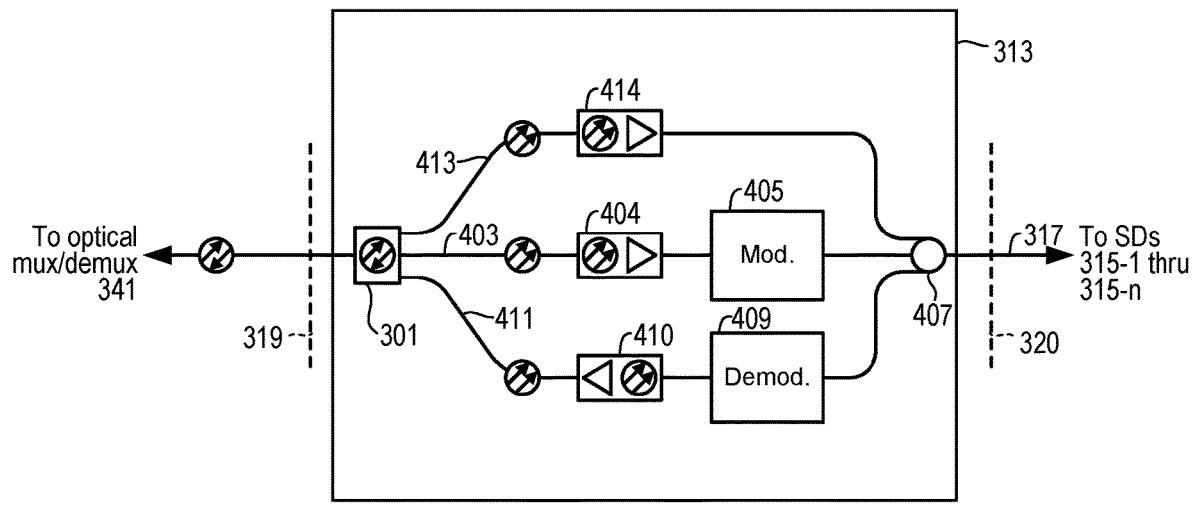
FIG. 5 is a block diagram showing additional details of the O/E node from FIG. 4.

FIG. 5 is a block diagram showing additional details of O/E node 313. Fiber 403 and receiver 404 are similar to fiber 103 and receiver 104 of FIG. 2. Modulator 405 is similar to modulator 105 of FIG. 2, but modulates data onto a smaller portion of the downstream RF channels of coaxial leg 312. Demodulator 409, transmitter 410 and fiber 411 are similar to demodulator 109, transmitter 110 and fiber 111 of FIG. 2. Optical mux/demux 301 is similar to mux/demux 101 of FIG. 2, except that the optical signal on wavelength λ3 is separated and output over a fiber 413 to receiver 414. Receiver 414 converts that optical signal to an electrical signal and passes that electrical signal to splitter 407. The output from receiver 414 and from modulator 405 are combined in splitter 407 and continue across coaxial interface 320 onto coaxial cable 317.

Figure 6:
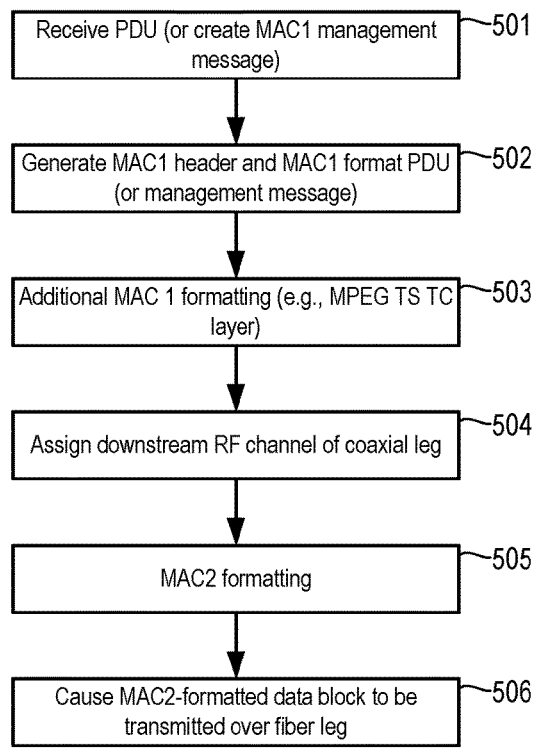
FIG. 6 is a flow chart showing operations performed by an access platform according to some embodiments.

FIG. 6 is a flow chart showing operations performed by CMAP 14 and CMAP 314 according to some embodiments. Similar operations could be performed by devices (or combinations of devices) other than a CMAP. In block 501, a PDU is received or a MAC1 management message is generated. In block 502 a MAC1 header is created and appended to the PDU (if a PDU was received in block 501) or added to the management messages (if a MAC1 management message was created in block 501). In block 503, additional MAC1 formatting may be added. For example, the output from block 503 could be further formatted as part of an MPEG transport stream transport convergence layer as described in various DOCSIS standards. In block 504, the CMAP identifies and assigns a downstream RF channel that will be used in the HFC coaxial leg to carry a modulated signal component communicating the output of block 503. In block 505, MAC2 formatting is added to the output from block 503, which formatting includes data indicating the RF channel identified and assigned in block 504. In block 506, the CMAP causes the output from block 505 to be communicated over the HFC fiber leg using binary modulation.

Figure 7:
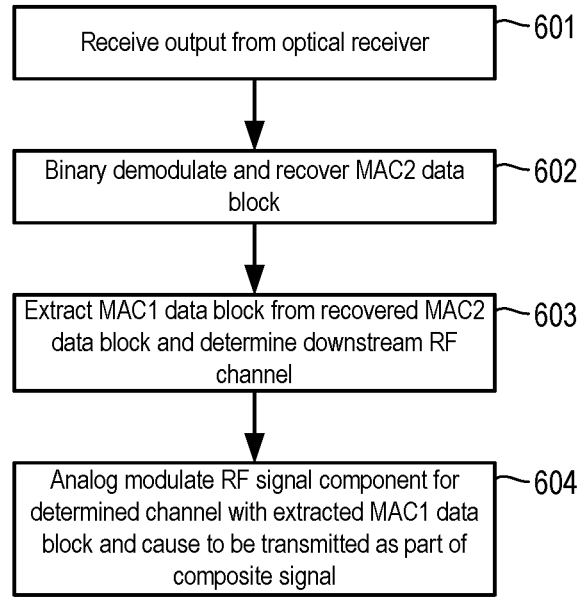
FIGS. 7 and 8 are flow charts showing operations performed by an O/E node according to some embodiments.

FIG. 7 is a flow chart showing operations performed by O/E node 13 and O/E node 313 according to some embodiments. In block 601, the modulator (105 in FIG. 2, 405 in FIG. 5) receives the output from the optical receiver (104 in FIG. 2, 404 in FIG. 5). In block 602, the modulator binary demodulates the optical receiver output to recover a MAC2 data block. In block 603, the modulator extracts a MAC1 data block from the recovered MAC2 data block and determines the downstream RF channel over which the extracted MAC1 data block is to be communicated as an analog modulated RF signal component. In block 604 the modulator analog modulates an RF signal component at the frequency of the determined RF channel so as to represent the extracted MAC1 data block and causes the signal component to be transmitted over the HFC coaxial leg as part of a composite downstream electrical signal.

Figure 8:
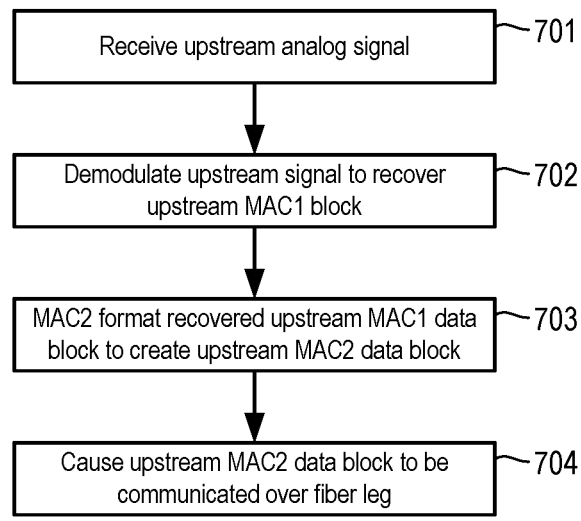

FIG. 8 is another flow chart showing operations performed by O/E node 13 and O/E node 313 according to some embodiments. In block 701, the demodulator (109 in FIG. 2, 409 in FIG. 5) receives an upstream analog signal across the coaxial interface. In block 702, the demodulator demodulates the upstream signal (or a component thereof) to recover an upstream MAC1 data block generated and transmitted by a subscriber device. In block 703, the demodulator adds MAC2 formatting to the upstream MAC1 data block. In block 704, the demodulator causes the output of block 703 to be communicated upstream over the HFC fiber leg as a binary modulated optical signal.

The above described embodiments offer various advantages. A binary modulated optical signal is less susceptible to noise than an analog modulated optical signal, both during the transport of the signal and when processing that signal at a modulator, demodulator or other device. If analog modulation is used for communication in the fiber leg, noises cascade across the entire HFC plant and require a higher optical signal to noise ratio (SNR) to achieve reliable communication. Conversely, an HFC plant in which binary modulation is used for the fiber leg communication will not cascade noise from the fiber leg to the coaxial leg (or will cascade much less noise), thereby permitting use of optical signals with a lower SNR. A lower required SNR can reduce maintenance and increase reliability. Similar reduction in SNR requirements can be achieved with regard to upstream communications when those communications are carried over the fiber leg in binary modulated form.

Even if only a portion of the fiber leg communications are binary modulated (as in the embodiment of FIG. 4), a substantial reduction in cascaded noise can be achieved, and required SNR on the fiber leg reduced. Use of both binary and analog modulation in the fiber leg also offers additional benefits in some circumstances. Such embodiments permit easier incorporation of O/E nodes such as nodes 13 (FIG. 2) and 313 (FIG. 4) into an existing HFC network. MAC functionality already located within a CMAP or other device can still be used, and QAM modulators previously used for channels to be communicated using binary modulation can be re-allocated for use with channels that will continue to be communicated using QAM modulation. Moreover, there are benefits to using a more centrally-located analog modulator for data (e.g., multicast CATV content) that will be sent to large groups of subscribers and pushing analog modulation of narrowcast content deeper into the HFC network. For example, QAM modulation is somewhat computationally intensive. If the data on a particular downstream channel (or group of downstream channels) will be sent to all subscribers in the service groups of each of multiple O/E nodes, it is more efficient to create QAM signals for that channel in one central device than to recreate that channel in each of multiple O/E nodes.

The above discussion gives 390 MHz as an example of a dividing point between analog modulation and binary modulation. Specifically, in some embodiments data to be communicated over an HFC coaxial leg in channels below 390 MHz are communicated over the fiber leg as an analog modulated signal and data to be communicated over the HFC coaxial leg in channels above 390 MHz are communicated over the fiber leg as a binary modulated signal. However, this is but one example, and other dividing points could be used.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. The features of the embodiments described herein may be combined in all possible combinations of methods, apparatus, modules, systems, and computer program products.

The invention claimed is:

1. A method comprising:
   receiving, by a node via a first network, a binary modulated optical signal comprising data blocks formatted in accordance with a first medium access control (MAC) protocol, wherein the data blocks encapsulate data blocks formatted in accordance with a second protocol that is different from the first MAC protocol; and
   sending, by the node via a second network and to at least one device, the data blocks formatted in accordance with the second protocol.

2. The method of claim 1, wherein the sending comprises:
   converting, by the node, the data blocks formatted in accordance with the second protocol to an analog modulated signal; and
   sending, by the node via the second network and to the at least one device, the analog modulated signal.

3. The method of claim 1, wherein the first MAC protocol or the second protocol define rules regarding encapsulation for transmission of data blocks.

4. The method of claim 1, wherein the first MAC protocol or the second protocol define rules regarding formatting for transmission of data blocks.

5. The method of claim 1, wherein the first MAC protocol is associated with Ethernet.

6. The method of claim 1, wherein the second protocol is associated with data over cable system interface specifications (DOCSIS) standards.

7. The method of claim 1, wherein the binary modulated optical signal comprises data associated with one of Internet web browsing, email, video on demand (VOD) content, or encoded voice data.

8. The method of claim 1, wherein the sending comprises sending, based on the data blocks formatted in accordance with the second protocol, an analog modulated signal including data associated with one of Internet web browsing, email, video on demand (VOD) content, or encoded voice data.

9. The method of claim 1, wherein the binary modulated optical signal indicates a frequency for converting the data blocks formatted in accordance with the second protocol to an analog modulated signal.

10. An apparatus comprising:
    circuitry configured to:
      receive, via a first network, a binary modulated optical signal comprising data blocks formatted in accordance with a first medium access control (MAC) protocol, wherein the data blocks encapsulate data blocks formatted in accordance with a second protocol that is different from the first protocol; and
      send, via a second network and to at least one device, the data blocks formatted in accordance with the second protocol.

11. The apparatus of claim 10, wherein the circuitry is further configured to send the data blocks by:
    converting the data blocks formatted in accordance with the second protocol to an analog modulated signal; and
    sending, via the second network and to the at least one device, the analog modulated signal.

12. The apparatus of claim 10, wherein the first MAC protocol or the second protocol define rules regarding encapsulation for transmission of data blocks.

13. The apparatus of claim 10, wherein the first MAC protocol or the second protocol define rules regarding formatting for transmission of data blocks.

14. The apparatus of claim 10, wherein the first MAC protocol is associated with Ethernet.

15. The apparatus of claim 10, wherein the second protocol is associated with data over cable system interface specifications (DOCSIS) standards.

16. The apparatus of claim 10, wherein the binary modulated optical signal comprises data associated with one of Internet web browsing, email, video on demand (VOD) content, or encoded voice data.

17. The apparatus of claim 10, wherein the binary modulated optical signal indicates a frequency for converting the data blocks formatted in accordance with the second protocol to an analog modulated signal.

18. The apparatus of claim 10, wherein the circuitry is further configured to send the data blocks by:
based on the data blocks formatted in accordance with the second protocol, sending an analog modulated signal including data associated with one of Internet web browsing, email, video on demand (VOD) content, or encoded voice data.

19. A non-transitory machine-readable medium storing instructions that, when executed, cause:
receiving, based on a binary modulated optical signal received via a first network, a signal comprising data blocks formatted in accordance with a first medium access control (MAC) protocol, wherein the data blocks encapsulate data blocks formatted in accordance with a second protocol that is different from the first MAC protocol; and
sending, via a second network and to at least one device, the data blocks formatted in accordance with the second protocol.

20. The non-transitory machine-readable medium of claim 19, wherein the instructions, when executed, cause the sending by causing:
converting the data blocks formatted in accordance with the second protocol to an analog modulated signal; and
sending, via the second network and to the at least one device, the analog modulated signal.

21. The non-transitory machine-readable medium of claim 19, wherein the instructions, when executed, cause the sending by causing:
sending, based on the data blocks formatted in accordance with the second protocol, an analog modulated signal including data associated with one of Internet web browsing, email, video on demand (VOD) content, or encoded voice data.

22. The non-transitory machine-readable medium of claim 19, wherein the instructions, when executed, cause the receiving by causing:
receiving the binary modulated optical signal comprising data associated with one of Internet web browsing, email, video on demand (VOD) content, or encoded voice data.

23. The non-transitory machine-readable medium of claim 19, wherein the instructions, when executed, cause the receiving by causing:
receiving the binary modulated optical signal indicating a frequency for converting the data blocks formatted in accordance with the second protocol to an analog modulated signal.

24. The non-transitory machine-readable medium of claim 19, wherein the instructions, when executed, cause the receiving by causing:
receiving the signal comprising data blocks formatted in accordance with the first MAC protocol, wherein the first MAC protocol is associated with Ethernet.

25. The non-transitory machine-readable medium of claim 19, wherein the instructions, when executed, cause the sending by causing:
sending the data blocks formatted in accordance with the second protocol, wherein the second protocol is associated with data over cable system interface specifications (DOCSIS) standards.

26. A system comprising:
a node; and
a computing device;
wherein the node comprises:
circuitry configured to:
receive, via a first network, a binary modulated optical signal comprising data blocks formatted in accordance with a first medium access control (MAC) protocol, wherein the data blocks encapsulate data blocks formatted in accordance with a second protocol that is different from the first MAC protocol; and
send, via a second network and to at least one device, the data blocks formatted in accordance with the second protocol; and
wherein the computing device comprises:
one or more processors; and
memory storing instructions that, when executed by the one or more processors, cause the computing device to:
receive the data blocks.

27. The system of claim 26, wherein the circuitry is further configured to send the data blocks by:
converting the data blocks formatted in accordance with the second protocol to an analog modulated signal; and
sending, via the second network and to the at least one device, the analog modulated signal.

28. The system of claim 26, wherein the circuitry is further configured to send the data blocks by:
based on the data blocks formatted in accordance with the second protocol, sending an analog modulated signal including data associated with one of Internet web browsing, email, video on demand (VOD) content, or encoded voice data.

29. The system of claim 26, wherein the circuitry is further configured to receive the binary modulated optical signal by:
receiving the binary modulated optical signal comprising data associated with one of Internet web browsing, email, video on demand (VOD) content, or encoded voice data.

30. The system of claim 26, wherein the circuitry is further configured to receive the binary modulated optical signal by:
receiving the binary modulated optical signal indicating a frequency for converting the data blocks formatted in accordance with the second protocol to an analog modulated signal.

* * * * *

UNITED STATES PATENT AND TRADEMARK OFFICE
CERTIFICATE OF CORRECTION

| | | |
|---|---|---|
| PATENT NO. | : 12,096,165 B2 | Page 1 of 1 |
| APPLICATION NO. | : 17/946359 | |
| DATED | : September 17, 2024 | |
| INVENTOR(S) | : Salinger et al. | |

It is certified that error appears in the above-identified patent and that said Letters Patent is hereby corrected as shown below:

In the Claims

Column 12, Line 43:
In Claim 10, after "first", insert --MAC--

Signed and Sealed this
Twelfth Day of August, 2025

Coke Morgan Stewart
*Acting Director of the United States Patent and Trademark Office*